United States Patent
Payne et al.

(10) Patent No.: US 9,424,426 B2
(45) Date of Patent: Aug. 23, 2016

(54) DETECTION OF MALICIOUS CODE INSERTION IN TRUSTED ENVIRONMENTS

(71) Applicant: Coveros, Inc., Fairfax, VA (US)

(72) Inventors: Jeffery Payne, Paeonian Springs, VA (US); Mark Fenner, Forty Fort, PA (US); Richard Mills, Ashburn, VA (US)

(73) Assignee: COVEROS, INC., Fairfax, VA (US)

( * ) Notice: Subject to any disclaimer, the term of this patent is extended or adjusted under 35 U.S.C. 154(b) by 0 days.

(21) Appl. No.: 14/258,741

(22) Filed: Apr. 22, 2014

(65) Prior Publication Data
US 2015/0302198 A1    Oct. 22, 2015

Related U.S. Application Data

(60) Provisional application No. 61/815,311, filed on Apr. 24, 2013.

(51) Int. Cl.
*G06F 12/14*    (2006.01)
*G06F 21/56*    (2013.01)

(52) U.S. Cl.
CPC .................. *G06F 21/562* (2013.01)

(58) Field of Classification Search
None
See application file for complete search history.

(56) References Cited

U.S. PATENT DOCUMENTS

| | | | | |
|---|---|---|---|---|
| 2011/0161912 A1* | 6/2011 | Eteminan | ................ | G06F 8/20 717/101 |
| 2012/0317645 A1* | 12/2012 | Fortier | ................ | G06F 21/566 726/24 |
| 2013/0340076 A1* | 12/2013 | Cecchetti et al. | .............. | 726/23 |

* cited by examiner

*Primary Examiner* — Brandon Hoffman
(74) *Attorney, Agent, or Firm* — Terry M. Sanks, Esq.; Beusse Wolter Sanks & Maire, PLLC

(57) ABSTRACT

Methods and computer program products which facilitate detection of malicious code insertion by an insider during the software development lifecycle are disclosed Aspects focus on behavioral characteristics associated with the introduction of malcode during the software development process. Injection of malcode by an insider threat, and the malcode itself, may leave behind behavioral signatures in the source code repository and source code that can be detected by a multi-dimensional combination of sensors. By detecting the behavioral signatures of malcode within artifacts generated by the software development process, instances of malcode can be isolated and prevented before release.

18 Claims, 4 Drawing Sheets

DETECTION OF MALICIOUS CODE INSERTION IN TRUSTED ENVIRONMENTS

CROSS REFERENCE TO RELATED APPLICATION

This application claims the benefit of U.S. Provisional Patent Application No. 61/815,311, filed Apr. 24, 2013, and entitled "Detection of Malicious Code Insertion in Trusted Environments," the entire contents of which is incorporated herein by reference.

STATEMENT REGARDING FEDERALLY SPONSORED RESEARCH

Aspects of the present disclosure were made with government support under FA8750-11-C-0106 awarded by the Department of the Air Force. The government has certain rights in this disclosure.

FIELD OF THE DISCLOSURE

The present disclosure generally relates to electronic security and more particularly to detecting and preventing insertion of malicious code.

BACKGROUND

Malicious code (malcode) may be inserted into software applications during the software development lifecycle (SDLC). Malcode includes computer viruses, exploits, worms, logic bombs, keyloggers, spyware, Trojan horses and the like. Malcode is used to disrupt computing device operations, repurpose or hijack computing devices, gather sensitive information, gain access to access-controlled systems, and the like. Similarly, malcode may also be designed to affect all or portions of a computer network, including coopting a network to further spread the malcode, gather sensitive information, and the like.

Sophisticated malcode attacks demonstrate the far-reaching consequences of these tactics. It is important to avoid or mitigate such attacks because software and electronically stored information plays a pervasive and crucial role in individuals personal lives, business, and in national security. Physical property can also be affected by malcode. For example, the Stuxnet computer worm was engineered to spread across computer networks and infiltrate and attack programmable logic controllers made by a specific company connected to specified motors used uranium enrichment in order to curtail weapon of mass destruction development programs in rogue nations. This was the first widely reported instance of malcode destroying physical devices.

Software plays an increasingly important role in national security. For example, software supports defense communications and mission. Software controls the critical infrastructure and weapon systems that protect the homeland. Unfortunately, the mission-critical nature of this software has made it a target for attack. U.S. adversaries, including spies and terrorists, are constantly working to compromise defense systems and critical infrastructure software. A 2008 report from the U.S. Department of Defense has highlighted this risk, stating "High-end attackers will not be content to exploit opportunistic vulnerabilities, which might be fixed and therefore unavailable at a critical juncture. They may seek to implant vulnerability for later exploitation."

Substantial research and development has explored methods and technologies for preventing attacks on critical software systems. Prevention techniques include restricting access, proactively identifying network and application vulnerabilities, and monitoring both networks and applications to detect intrusions. While all of these techniques have been successful at reducing the threat of system compromise, they are ineffective when applied to an insider threat. An insider threat is any effort being performed in support of an adversarial mission or goal from within a trusted environment. What sets insider threats apart from other threats is the use of normal activities by adversaries to accomplish abnormal and malicious missions. Normal activities include supporting deployed software platforms and assisting in portions of the software development cycle. Many security defenses seek to identify adversaries by their abnormal tactics; therefore it is often difficult to detect insider threats with traditional approaches.

Identification of malcode when it is being inserted into software applications during the software development cycle stops malcode before it can be implemented or distributed. This minimizes and in most cases eliminates the potentially dangerous consequences the malcode is intended to implement because the malcode can be removed before the software is released "into the wild." Furthermore, identification facilitates apprehending the individuals or groups who sought to implement the malcode in the first place. Compared to attempting to identify the person who implemented the malcode after the software has been released and the failures have been identified through experiencing the effects of the malcode, connecting the malcode to the individual who sought to implement is easier to facilitate when the malcode is quickly identified during development.

While some types of malware can be identified using off-the-shelf virus and malware detectors, malcode incorporated into source code during the software engineering process is far more difficult to detect. Sophisticated malcode, placed in source code, can look just like normal application logic when coded as part of the software development process. Likewise, malcode can be obfuscated effectively when crafted properly. Detailed, insider knowledge of an application and its environment can also help an adversary create malcode that is more difficult to detect and also more effective than generic malware.

Current approaches that attempt to identify malcode during development rely on techniques borrowed from generic software security analysis, namely: examining coding constructs for suspicious functionality, analyzing structural characteristics of binary code, or security testing for vulnerabilities. These techniques may be applied to detect malcode during software development but the solutions are not specific to insider threats or the detection of malcode created within otherwise legitimate software. Many of the current techniques have a significant number of false positives, due to the difficulty in distinguishing between legitimate functionality and malicious code. Further, due to an adversary's ability to obfuscate their intent, such techniques are prone to returning a significant number of false negatives, failing to detect the presence of malcode. Furthermore, malicious code can often appear to be a mistake, providing malicious insiders with plausible deniability when the malcode is discovered.

Given the foregoing, facilitating identification of malcode inserted during the software development cycle is needed. In particular, reductions of false negatives and false positives and detection of malcode created within otherwise legitimate software is desired. Further, what is needed are ways of facilitating identification of malcode insertion by insiders.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing methods and computer program products which facilitate, during the software development cycle, identification of malcode planted within software by an insider. Due to the difficulty in identifying malcode at the development stage, such methods and computer program products may be used in concert with prior techniques.

Specifically, in an aspect, methods and computer program products are disclosed which focus on behavioral characteristics associated with the introduction of malcode during the software development process. Injection of malcode by an insider threat, and the malcode itself, may leave behind behavioral signatures in the source code repository and the source code, itself, that can be detected by a multi-dimensional combination of sensors. Further, the combination of multiple sensors decreases the number of false positive alerts and false negative non-detection of malcode. By detecting the behavioral signatures of malcode within artifacts generated by the software development process, instances of malcode can be isolated from within large code bases. Doing so results in a significant reduction in false positives and false negatives.

In an aspect of the present disclosure, a multi-dimensional analysis utilizing multiple sensors analyzes activity during the software development cycle. Code locations that are flagged by multiple sensors are more likely to include malcode and are thus tagged or otherwise noted for further analysis and/or removal. Dimensions analyzed may include coding habits, testing habits, work habits and build habits.

An aspect of the present disclosure comprises various tools and frameworks to glean information from software development artifacts (such as code, test case, source repository meta-data, etc.) and code that implements specific sensors, coordinates analysis activities, and aggregates results.

Aspects of the present disclosure may detect, among other types of malcode, time bombs within source code applications. Time bombs are a form of triggered behavior. They may be utilized to perform a nefarious act at a particular time in the future (absolute or relative).

Aspects of the present disclosure may be configured to reduce false negatives, reduce false positives, function with one or more sensors not being used, and analyze large programs quickly.

The present disclosure may be used to facilitate analyzing software development artifacts (e.g., source code, test results, source code repository meta-data, and build environment information) to identify malicious code resident within software. Aspects may be used to that complement static code analysis and collectively point toward malcode.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

Figure 1:
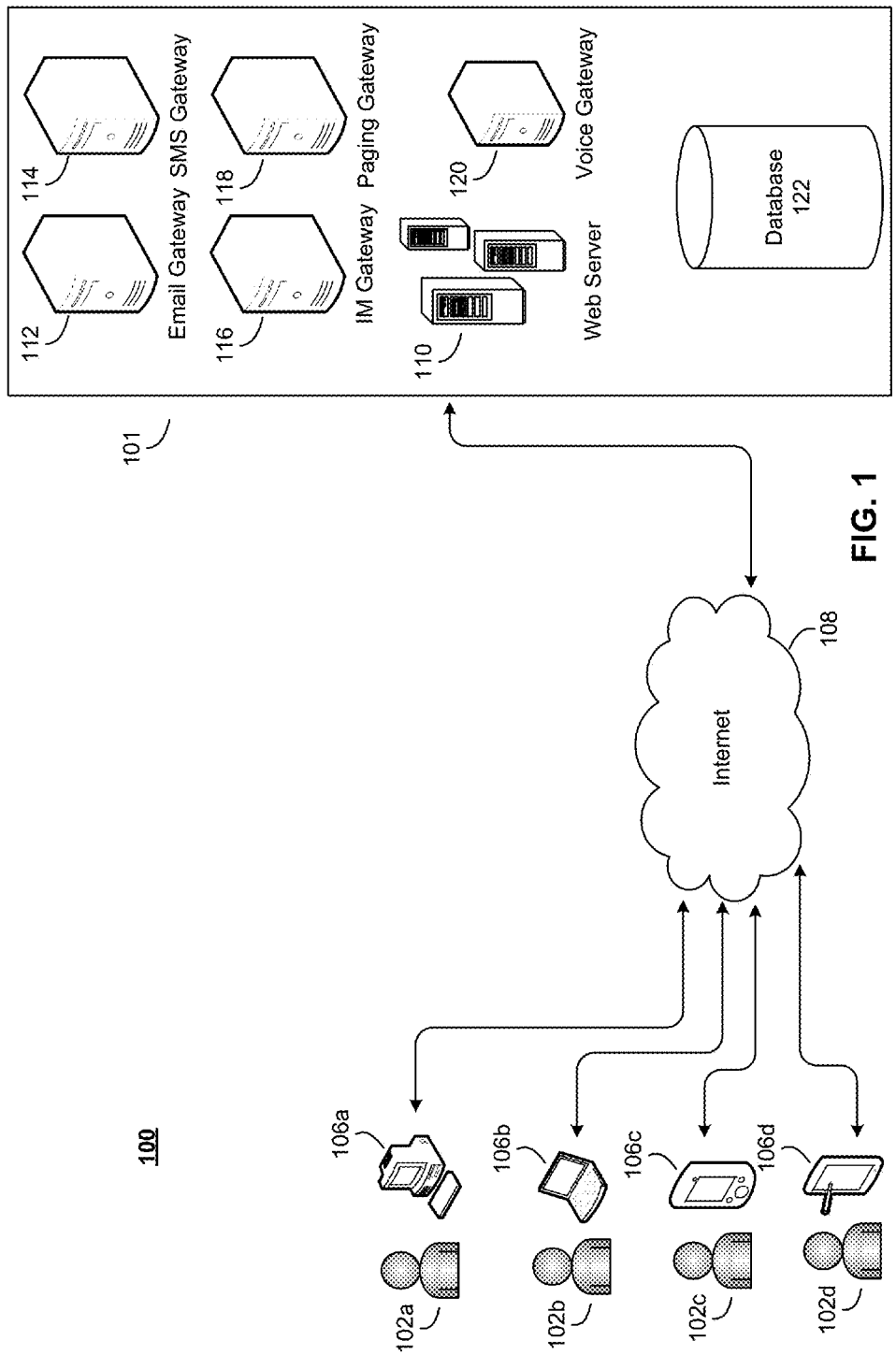
FIG. 1 is a block diagram of an exemplary environment in which malcode inserted by insider threats within a software development lifecycle is identified, according to an aspect of the present disclosure.

The present disclosure is directed to methods and computer program products for facilitating the identification of malicious code (malcode) inserted into software applications during the software development lifecycle (SDLC). Such methods and computer program products analyze behavior during the SDLC in order to identify the insertion of malcode. The present disclosure may be used to facilitate analyzing software development artifacts (e.g., source code, test results, source code repository meta-data, and build environment information) to identify malicious code resident within software. Aspects may be used to that complement static code analysis and collectively point toward malcode.

Behavioral characteristics associated with the introduction of malcode during the software development process are utilized to detect the injection of malcode by insider threat. A multi-dimensional combination of sensors may be utilized to detect malcode.

In an aspect of the present disclosure, a multi-dimensional analysis utilizing multiple sensors analyzes activity during the software development cycle. Code locations that are flagged by multiple sensors are more likely to include malcode and are thus tagged or otherwise noted for further analysis and/or removal. Dimensions analyzed may include coding habits, testing habits, work habits and build habits.

An aspect of the present disclosure comprises various tools and frameworks to glean information from software development artifacts (such as code, test case, source repository meta-data, etc.) and code that implements specific sensors, coordinates analysis activities, and aggregates results.

Aspects of the present disclosure may detect, among other types of malcode, time bombs within source code applications.

An insider threat is any effort being performed in support of an adversarial mission or goal from within a trusted environment. The software development lifecycle may include requirements, design, implementation, build, testing, deployment, and maintenance. Malicious code, or malcode, describes intentionally crafted SDLC artifacts that cause undesired effects, security breaches, damage to a system, or the like. Malcode may be engineered to cause security compromise such as: unauthorized system access or modification, unauthorized data access or modification, unauthorized monitoring or recording of activities, interference with normal activities, propagation of malicious functionality to other systems, or a combination of these compromises.

Malicious code also includes any code added, changed, or removed from a software system in order to intentionally cause harm or subvert the intended function of the system.

Malcode may cause a variety of unauthorized actions including privilege escalation, triggered events, deceitful functionality, nefarious communication, self-replicating code, obfuscation, and dynamic code behavior. Privilege escalation (e.g., backdoor or trapdoors) includes methods of bypassing authentication or other security controls in order to access a computer system or the data contained on that system such as special credentials, hidden commands or purposefully poor authentication protocols. Triggered events are malicious functionality set to detonate at a particular time or by a certain logical event in the software such as a time bomb or logic bomb. Deceitful functionality is functionality that masquerades as one set of functionality while performing malicious acts, such as a Trojan horse. Nefarious communication is the establishment and use of authorized and unauthorized communication channels for illegitimate purposes such as monitoring. Self-replicating code is software that is able to replicate itself into another application or onto another system such as a virus or worm. Malicious code is often obfuscated to escape detection via, for example, encoding, encryption and the like. Dynamic code behavior is code that is dynamically injected into an application, compiled during program execution, or spawned and run from within another application such as a command shell, an attack script and the like.

A behavioral signature is a pattern that includes the steps necessary to carry out a given task. For example, in computer systems, writing information to a file requires (1) have the target information available, (2) identifying the target file, (3) opening the target files, (4) writing the information to the target file, and (5) closing the target file. If any of these steps are missing, the fundamental behavior is not that of writing to a file. Thus, these steps constituted a set of defining characteristics which, although they may be implemented in different ways, must be present in some fashion in all file writing operations. Each of these steps constitutes a dimension of the file writing operation.

The behavior of engineers and others involved in the SDLC may indicate the creation or implementation of malcode. Types of behavior include irregular coding, irregular testing, irregular builds, and irregular work habits.

With respect to irregular coding behaviors, software engineers are creatures of habit and this is reflected in the code they write. Much like a writer has a writing style, a software developer tends to create code that is structured in a particular way. Everything from the complexity of the logic to how variable names are defined to the use of parentheses is typically consistent across all functions and modules a programmer creates. This consistency may be observed, documented and a template or baseline stored for comparison to code as its being created.

Unfortunately for the malicious insider, malcode for a given task must follow a behavioral signature for that task. The structure of the malcode provides a behavioral signature for that code. Sometimes this structure will be much different than the rest of the code. Other times the code will need to include particular programming constructs, function calls, or operators/operands that are known to be used to create malicious code.

Observable aspects of irregular coding behaviors include variations in code complexity, code style, and condition taints. Differences in code complexity include differences in information volume and coding complexity between code modules. Differences in code style includes differences in coding structure or coding practices between code modules. Condition taints includes relationships between suspect variables and functions and the locations those variables and functions are used within conditionals.

In addition to these behaviors, traditional static code analysis results can be incorporated in as well such as detecting violations of secure coding standards (e.g., coding practices that are not generally accepted to be secure) and implementing dangerous coding constructs (e.g., use of libraries and function that are often used in the creation of malcode).

Irregular testing seeks to identify areas within the software that are not appropriately tested. Malicious code often includes hidden functionality that is placed within conditionals that are only exercised when a malicious insider chooses to trigger the attack. Exercising the malcode will typically expose it. If the code is exercised, the must be crafted to not reveal the malicious behavior. Irregular testing behaviors include code coverage (e.g., unexercised code including blocks, specific conditions within conditionals, dead code), test quality (e.g., the quality of the tests that exist in terms of identifying defects) and test case volume (e.g., the amount of tests associated with code).

Test case volume seeks to distinguish between areas of the software that are adequately tested and those that are not by the amount of tests that exists for a given area. As malicious code must often be very carefully tested by an insider threat as to not reveal its true purpose, it is likely that the amount of tests that exist will be different than in other areas of the code.

Irregular work habits are useful in detecting malcode insertion because, when malicious code is being introduced into an application, it is likely that the overall process the insider threat will follow for coding, testing, and building software will change to assist in escaping detection or due to the nature of the malicious code that is introduced. These changes are detectable across a set of irregular work habits that include: work times (e.g., work performed at odd hours), check-in frequency (e.g., changes in check-in frequency or pattern), and areas of focus (e.g., sudden changes in the areas of code that are being implemented or modified). This is of particular concern when these areas appear to have no clear tie to the other work being done by an individual. Changes in comment style and volume may also be relevant.

Information on irregular work habits can be culled directly from the meta-data collected and stored within a project repository as software is coded, tested, and built. This information can be analyzed for a particular snapshot in time or compared over time to detect relevant anomalies.

Modifications to the build process may support the nefarious purposes of an insider. As the build process controls which code is part of the resulting application(s), a malicious insider may modify this process to support their mission. Areas associated with the build process that can be used to support malicious intent include: (1) compiler flags and environment variables used to direct the compile process, (2) build scripts that control the overall build process and ultimate location of resulting executables, and (3) file directory paths that dictate where to find necessary code, libraries, and objects.

Irregular build habits that support the detection of malicious code include: changes to build configuration, utilization of new libraries without associated source code that can be reviewed and modification of resulting binary and executable files by other commands within the build process. As an example, a simple change to a compile line in a make file from: gcc main.c-Inormal.a-Imalicious.a to gcc main.c-Imalicious.a-Inormal.a will change which object code is linked into a program if the libraries malicious.a and normal.a include functions of the same name. A malicious insider can use this capability to replace legitimate functions with malicious ones In aspects of the present disclosure, a sensor is the basic tool for measuring an observable behavior. A detector is one or more sensors and a means to combine them which results in identification of an adversarial mission or a component. Multi-dimensional analysis is the use of a combination of sensor to categorize or recognize a behavioral signature.

Malcode indicators may be tied to genesis, time of introduction, or location. Genesis categorizes by the original intent or type of error. Time of introduction categorizes by when, during the software lifecycle, it is introduced. Location categorizes by position within a software development stack or reference model.

Referring now to FIG. 1, a block diagram of an exemplary system 100 for facilitating the identification of malcode inserted into software applications during the software development lifecycle (SDLC), is shown.

Software development environment 100 includes a plurality of developers 102 (shown as developers 102a-d in FIG. 1) accessing—via a computing device 106 (shown as respective computing devices 106a-d in FIG. 1) and a network 108, such as the global, public Internet—an application service provider's cloud-based, Internet-enabled infrastructure 101.

In various aspects, computing device 106 may be configured as: a desktop computer 106a; a laptop computer 106b; a Personal Digital Assistant (PDA) or mobile telephone 106c; a tablet or mobile computer 106d; any commercially-available intelligent communications device; or the like. System 100 may further comprise printing devices such as inkjet, thermal, or laser printers (not shown in FIG. 1).

As shown in FIG. 1, in an aspect of the present disclosure, an application service provider's cloud-based, communications infrastructure 101 may include one or more web servers 110, an email gateway 112, an SMS gateway 114, an Instant Message (IM) gateway 116, a paging gateway 118, a voice gateway 120, and a database 122. Database 122 may be configured to store software being developed, behavioral tracking data, baseline behavior parameters, information related to developer work habits, and the like. In alternate aspects, database 122 may comprise one or more data stores within (or remotely located from) infrastructure 101 or be a memory included in (or coupled to) web server 110. In an aspect, database 122 is remotely located and connected to network 108. In an aspect, database 122 comprises one or more source code repositories. Database 122 may house portions of or all code associated with a given software development project, including but not limited to previous versions of the source code, code in development, and the like.

As will be appreciated by those skilled in the relevant art(s) after reading the description herein, in such an aspect, an application service provider—an individual person, business, or other entity—may allow access, on a free registration, paid subscriber and/or pay-per-use basis, to infrastructure 101 via one or more World-Wide Web (WWW) sites on the Internet 108. Thus, system 100 is scalable.

As will also be appreciated by those skilled in the relevant art(s), in an aspect, various screens would be generated by server 110 in response to input from developers 102 over Internet 108. That is, in such an aspect, server 110 is a typical web server running a server application at a website which sends out webpages in response to Hypertext Transfer Protocol (HTTP) or Hypertext Transfer Protocol Secured (HTTPS) requests from remote browsers on various computing devices 106 being used by various developers 102. Thus, server 110 is able to provide a graphical user interface (GUI) to developers 102 of system 100 in the form of webpages. These webpages are sent to the manager's and agent's PC, laptop, mobile device, PDA or the like device 106, and would result in the GUI being displayed.

As will be appreciated by those skilled in the relevant art(s) after reading the description herein, alternate aspects of the present disclosure may include providing a tool for facilitating software development and detection of malicious code insertion from database 122 to devices 106 as a stand-alone system (e.g., installed on one server) or as an enterprise system wherein all the components of infrastructure 100 are connected and communicate via an intercorporate Wide Area Network (WAN) or Local Area Network (LAN). For example, in an aspect where developers 102 are all personnel/employees of the same company, the present disclosure may be implemented as a stand-alone system, rather than as a web service (i.e., Application Service Provider (ASP) model utilized by various users from different companies) as shown in FIG. 1.

Figure 2:
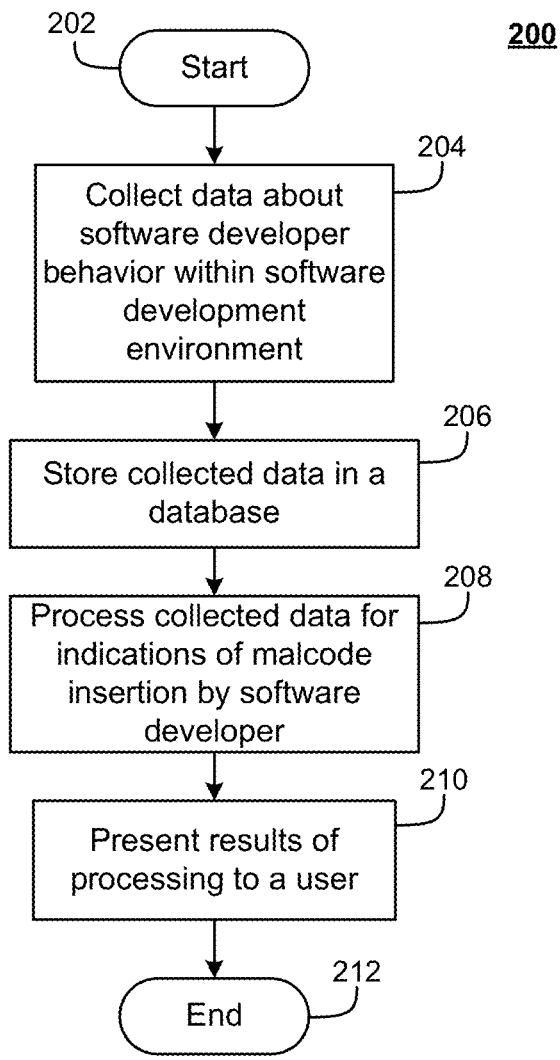
FIG. 2 is a flowchart illustrating an exemplary process for collecting information about software developer behavior in a software development environment and analyzing the collected information in order to identify malcode insertion, according to an aspect of the present disclosure.

Referring now to FIG. 2, a flowchart illustrating an exemplary process 200 for collecting information about software developer 102 behavior in a software development environment 100 and analyzing the collected information in order to identify malcode insertion, according to an aspect of the present disclosure, is shown.

Process 200, which may execute within system 100 and facilitate identification of malcode within a trusted environment such as a software development environment, source code repository, or the like, begins at step 202 with control passing immediately to step 204. System 101 maybe an analysis server communicatively coupled to one or more computing devices 106. The analysis server may be communicatively coupled to one or more databases 122 which store data collected. For example, database 122 may store data collected at step 204.

At step 204, system 101 collects data about software developer 102 behavior during software development. Data may be collected via sensors. Sensors are modules of system 101 which monitor code bases, computing devices 106, network 108 activity, and other portions of system 100 apparent to those skilled in the relevant art(s) after reading the description herein.

Sensors may collect data from a variety of sources, including: source code repository meta-data, static code analysis, and dynamic code analysis. Respectively, these sensors serve as input to detectors for work, code, and test habits, among other behaviors.

Source code repository management (SCM) software (such as git and subversion) tracks the development of files over time. Modifications to a file are recorded by committing changes to that file into the repository. In addition to the textual changes, SCM tools record meta-data pertaining to the commit. For example, git records the author, committer, time and date of code creation, time and date of entry into the repository, and comments attached to the commit. The meta-data is stored internally in the git repository and may be accessed via command-line and graphical tools. The meta-data may also be accessed by SCM analysis tools, such as cvsanaly, used by the mining software repositories research community. The meta-data forms the major basis of work habit analysis.

Static code analysis sensors include off-the-shelf static security, flaw, or style analysis tools and hand-crafted static analyzers built using clang plugins. Each of these tools produces results for each function in a targeted source file. The code complexity tools produce a complexity value for each function; the remaining tools produce line-by-line annotations which can be associated with functions by line number.

Dynamic analysis sensors include line, branch, function, and file coverage. For a given commit, a project build system is directed to produce an instrumented binary capable of recording its own execution. A testing driver executes the instrumented binary code, which results in a trace of execution lines and paths through the original source file. The execution record is then post-processed by a coverage analyzer (e.g., gcov) into line and branch coverage percentages for each function. Dynamic analysis provides the basic sensors to perform test habit analysis.

At step 206, data collected in step 204 is stored. Collected data may be stored in database 122.

At step 208, the collected data is processed in order to determine if malcode has been inserted. Sensor data may be utilized. Data from a plurality of sensors may be utilized in order to perform a multi-dimensional analysis of the software being developed. Data may be processed in a rule-based manner. A rule-based approach relies on a fixed definition of the characteristics of an event of interest. Secure static code analysis tools use this approach to identify potential vulnerabilities in software. Rule-based detection of vulnerabilities works well when the distinction between normal and abnormal behavior can be very precisely defined such as working outside of normal work hours or patterns.

Two specific types of rules are propositional rules and first-order predicate logic (FOPL) rules. Propositional rules are defined over the attributes of a single domain object.

In a representation, the single objects of interest are source code locations. Examples of locations include commits, a (commit, file) pair, a function within a file, a function within a (commit, file) pair, and so forth. The most specific source code location we track as a distinct object is a line of code. Attributes on a source code location object include when a function's file was modified, what a function's cyclomatic complexity is, the percentage of line coverage achieved in testing that function, whether a line is uncovered, and if a line has a static security flaw.

One form of this representation is that source code location objects are rows in tables of like kinds. For example, each commit level object is row in a table of all commits. Each function level object is a row in a table of functions. The descriptors of an object are spread over the columns in the table. Propositional rules are tests on one or more columns of a single row. An example of a propositional rule is:

R1: if Time of Commit not in [0900, 1700] then Suspicious Behavior

Alternatively, this rule can be expressed as:

R2: if IsRare(Time of Commit, Uniform (0900, 1700), Threshold) then Suspicious Behavior where IsRare computes the probability that a variable takes a value greater than Threshold on the specified probability distribution. In the case of R2, Uniform (0900, 1700) specifies that all the occurrences of Time of Commit are between 9:00 AM and 5:00 PM. Thus, the probability of seeing values before 9:00 AM (and after 5:00 PM) are zero. If Threshold in R2 is set to zero, then R2 is equivalent to R1. Both rules recognize any commit outside of a standard workday as suspicious. In either form, these rules represent a commitment to a fixed definition of extreme, rare, or abnormal behavior. In the case of R1 and R2, any deployment of these rules will note commits at 0700 as suspicious, regardless of typical coder behavior (i.e., an individual who arrives early to avoid commute delays), project timeline (i.e., projects near deadline with overtime occurring), or business processes (i.e., a 24-hour development cycle).

FOPL rules allow testing and specifying relationships among domain objects and the attributes of those objects. Returning to the table representation, the difference between FOPL and propositional rules is that, in FOPL rules, comparisons may be made and relationships specified between rows in addition to between columns within a single row. An example of a FOPL rule is:

R3: if UpdatedCode(X) and UpdatedCode(Y) and not CommonScope(X, Y) then Suspicious Behavior An English translation and instantiation of R3 is: if Foo and Bar are updated modules and they are not normally modified in tandem, then the behavior is suspicious. R3 formalizes the notion that code modifications exhibit some sort of temporal and spatial locality. The CommonScope relation can be implemented to specify different definitions of locality. For example, it can consider the location of code within a file hierarchy on the file system, the relationship between functions in a call graph, the history of code co-changes, and the recency of code modification.

Because of site-specific and developer-specific differences in behavior, it is useful to allow some rules to be parameterized with respect to the sensor values that the rule tests. In addition to a priori fixed rules, rule may be model parameters are estimated from historical data. Thus, if there were reason to believe that the times of commits approximated a normal distribution, the mean and variance could be estimated from those commit times, yielding a rule:

R4: if IsRare(TimeOfCommit, Normal(mean, variance), Threshold) then Suspicious Behavior An English translation of R4 is: if the time of a commit is sufficiently different from the typical time of commit estimated from this project's history, then the behavior is suspicious. R2 and R4 demonstrate the difference between identifying rarity with an a priori model (R2) and a model with parameters inferred from the values of the TimeOf-Commit data values (R4).

Data may also be processed and analyzed according to algorithms developed via machine learning. Machine learning algorithms process information and learn the definition of normal over time. Events which are unexpected are classified as abnormal and can be highlighted for further analysis. Machine learning algorithms excel in situations where the definition of normal is not fixed (i.e., differs from data set to data set) and therefore can be used effectively without an upfront understanding of normal behavior. This allows behaviors to be identified not only across a wide range of habits that are collected but also over time to detect changes in behavior.

The application of rules to raw sensor data is sometimes referred to as a detector. Results from detectors may be aggregated in order to identify malcode. In some aspects, aggregation may reduce the risk of misidentification. Detectors may be configured to identify malicious coding activity within at least the following categories: coding behavior, testing behavior, build behavior, and work habit. Detector results may be aggregated by summing the results. In another aspect, detector results may be aggregated based on code location or characteristic of the detector result. Code locations form a natural hierarchy: files are part of a commit, functions are part of a file, and lines are part of a function (or the global scope of a file). In some cases, it is useful to aggregate information to a location from locations above and below it in the hierarchy. For example, if a commit is identified as an odd work habit, every file within the commit is affected. In turn, every function and line within the affected files is also affected. So, the characteristics of a broader code location can be inherited by more specific locations.

Similarly, occurrences at a lower granularity can be aggregated to a higher level. For example, an overall measure of function safety could be given by the total number of static security findings within that function. This is naturally represented by aggregating all the findings at program locations within the function, counting the number of findings, and associating the total count with the function. Aggregating these results allows (1) comparison between different functions and (2) summarizing more detailed results at higher levels. Similar steps can be taken with blocks, files, and commits. Together with aggregation by type, these methods allow the system to summarize a large amount of data.

Rules like R4 are specified with respect to historical values. The scope of work relation in R4 is a function of co-modified files. Comparison of objects against each other and against the whole class of such objects can occur. For example, individual distributions of check-in times can be computed for each individual code module and a global distribution of check-in times can be computed over all modules. In the first case, details of the individual comparison, like parameters of a distribution, are computed on a per object basis: how does this object compare, individually, to other objects of the same class. In the second case, the global comparison is made between an individual and the behavior of the entire class. In both cases, the aggregation of information is performed in the estimation of parameters to the distributions.

The multiple, individual distribution computed for each module allows the system to distinguish when a time of a commit is suspicious for a module foo but is normal for a module bar. The single global distribution, computed over all modules, allows the detection of a time of commit that is suspicious for any module. In a special case of multiple, individual distributions, we can compare foo's current commit against its historical commits. Along with detecting suspicious behavior in changes to foo, this can also detect an agent masquerading to make changes to foo.

Similar groupings can be performed over code segments, as opposed to commits, to compare trends of measures on one function to another function and one function to the class of all functions. Simultaneous aggregation over commits and code segments allows identification of historical trends of scope of work for developers, answering the question: What modules are typically modified together?

At step 210, malcode findings are presented to an authorized user. In various aspects, malcode findings may be presented in one or more of the following manners: displaying the raw sensors which fire at given code locations, and displaying a hierarchy of important code locations with risky code locations highlighted. The display of raw sensors can be a simple list of each sensor's report, with important information, at a given code location. The hierarchy of locations may be trimmed in two ways. First, not all code locations have important findings. Second, for those locations which have findings, some ranking must be done to reduce the total number displayed. The reduction can be done by prioritizing multiple sensor activations over single sensor activations. Third, a partitioning of the location graph can display sub-sets of the space of locations at one time and control the amount of information presented to an analyst.

Process 200 terminates at step 212.

Figure 3:
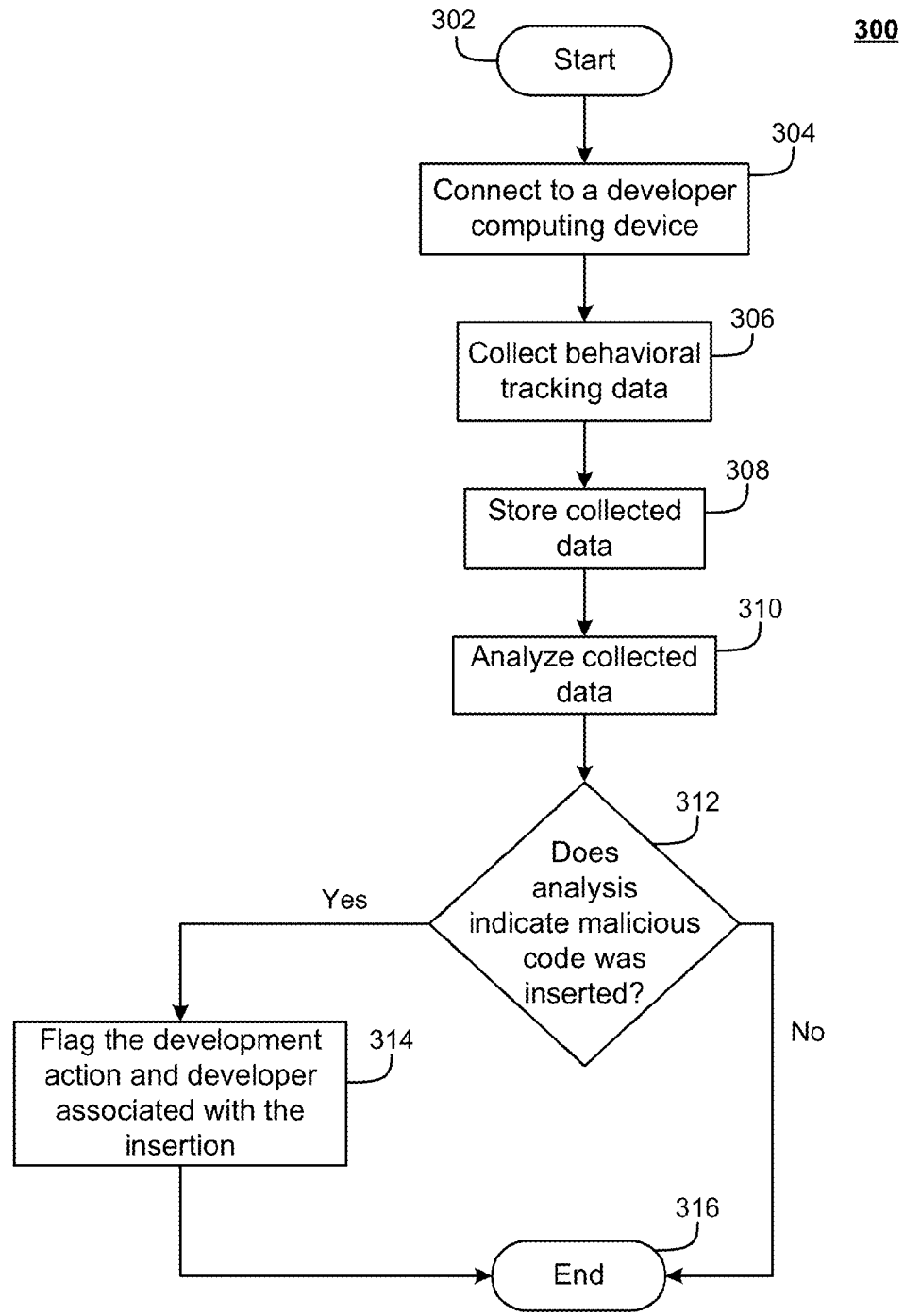
FIG. 3 is a flowchart illustrating an exemplary process for implementing an analysis engine to identify malcode insertion in a trusted environment, according to an aspect of the present disclosure.

Referring now to FIG. 3, a flowchart illustrating an exemplary process 300 for implementing an analysis engine to identify malcode insertion in a trusted environment, according to an aspect of the present disclosure, is shown.

Process 300, which may execute within system 100, begins at step 302 with control passing immediately to step 304.

At step 304, the analysis server, which may be a portion of infrastructure 101, connects to computing device 106 and/or other portions of system 100 in order to monitor the software development environment for insider threats. In an aspect, the analysis server connects to one or more code repositories and/or accesses the source code itself in order to facilitate process 300. As will be apparent to those skilled in the relevant art(s), the analysis server may be a portion of infrastructure 101, installed on a computing device connected to network 108, distributed across multiple computing devices within system 100, or otherwise implemented.

At step 306, multiple sensors within the analysis server collect behavioral tracking data for later analysis. The behavioral tracking data indicates the actions developer 102 took (e.g., send build command) and the associated behaviors (e.g., sent command late at night, sent command after a long pause in coding, and the like).

At step 308, the collected behavioral tracking data is stored in database 122.

At step 310, the collected data and software being developed is analyzed in order to determine if malcode has been inserted. The data may be analyzed in a multi-dimensional manner. Static code analysis and behavioral analysis may be performed. Behavioral code analysis is done by comparing the stored behavioral tracking data to a baseline behavior parameter stored in database 122.

At decision step 312, a result is returned based on analysis step 310. If the analysis indicates that malcode was inserted, process 300 proceeds to step 314. If the analysis does not indicate the presence of malcode, process 300 proceeds to termination step 316

At step 314, the code, development action and/or developer 102 associated with the malcode insertion is flagged for future analysis, quarantine, removal, and/or other actions apparent to those skilled in the relevant art(s).

Process 300 then terminates at step 316.

Figure 4:
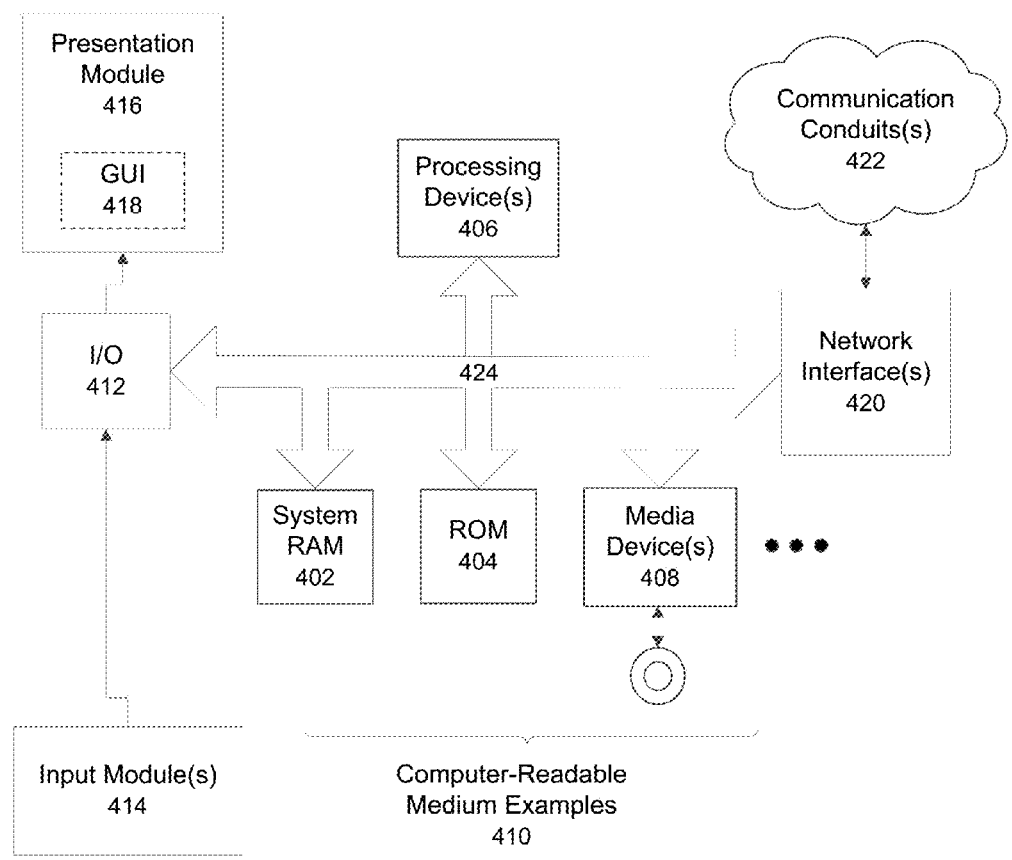
FIG. 4 is a block diagram of an example computing system useful for implementing the present disclosure.
Figure 4:

Referring now to FIG. 4, a block diagram of an exemplary computer system useful for implementing various aspects the processes disclosed herein, in accordance with one or more aspects of the present disclosure, is shown. FIG. 4 sets forth illustrative computing functionality 400 that may be used to implement web server 110, devices 106 utilized by developers 102 to access Internet 108, or any other component of environment 100. In all cases, computing functionality 400 represents one or more physical and tangible processing mechanisms.

Computing functionality 400 may comprise volatile and non-volatile memory, such as RAM 402 and ROM 404, as well as one or more processing devices 406 (e.g., one or more central processing units (CPUs), one or more graphical processing units (GPUs), and the like). Computing functionality 400 also optionally comprises various media devices 408, such as a hard disk module, an optical disk module, and so forth. Computing functionality 400 may perform various operations identified above when the processing device(s) 406 executes instructions that are maintained by memory (e.g., RAM 402, ROM 404, and the like).

More generally, instructions and other information may be stored on any computer readable medium 410, including, but not limited to, static memory storage devices, magnetic storage devices, and optical storage devices. The term "computer readable medium" also encompasses plural storage devices. In all cases, computer readable medium 410 represents some form of physical and tangible entity. By way of example, and not limitation, computer readable medium 410 may comprise "computer storage media" and "communications media."

"Computer storage media" comprises volatile and non-volatile, removable and non-removable media implemented in any method or technology for storage of information, such as computer readable instructions, data structures, program modules or other data. Computer storage media may be, for example, and not limitation, RAM 402, ROM 404, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 400 may also comprise an input/output module 412 for receiving various inputs (via input modules 414), and for providing various outputs (via one or more output modules). One particular output mechanism may be a presentation module 416 and an associated GUI 418. Computing functionality 400 may also include one or more network interfaces 420 for exchanging data with other devices via one or more communication conduits 422. In some aspects, one or more communication buses 424 communicatively couple the above-described components together.

Communication conduit(s) 422 may be implemented in any manner (e.g., by a local area network, a wide area network (e.g., the Internet), and the like, or any combination thereof). Communication conduit(s) 422 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, as described with reference to FIG. 4. The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A computer-implemented method of identifying malicious code insertion in trusted environments, the method comprising the steps of:
   (a) connecting an analysis server to a computing device utilized by a software developer to develop at least a portion of a software program;
   (b) collecting, via a plurality of sensor modules coupled to the analysis server, behavioral tracking data from the computing device, the behavioral tracking data indicating a software developer behavior during software development and including metadata indicating a development action, the development action caused by the software developer behavior and the behavioral tracking data includes testing behavior, wherein collecting further comprises producing, for a given commit, an instrumented binary code to record its own execution, and executing by a testing driver the instrumented binary code, which results in a trace of execution lines and paths through an original source file;
   (c) storing, in a database communicatively coupled to the analysis server, the behavioral tracking data;

(d) analyzing, via the analysis server, the software program for the presence of malicious code, the analysis including a comparison of the stored behavioral tracking data to a baseline behavior parameter stored in the database;

(e) flagging, via the analysis server, the development action where the analysis indicates malicious code insertion; and (f) presenting, via a user interface communicatively coupled to the analysis server, an analysis report, the analysis report comprising an analyzing step result and a flagging step result.

2. The method of claim 1, analyzing step (d) further comprising:

performing a static code analysis of the software program;
wherein the analysis indicates malicious code insertion when a behavioral anomaly and a static code analysis anomaly are detected.

3. The method of claim 1, wherein, the plurality of sensors further to collect behavioral tracking data related to at least one of: coding behavior, testing habits, build behavior, and work habits.

4. The method of claim 1, wherein collecting step (b) occurs over time.

5. The method of claim 2, wherein collecting step (b) occurs throughout a software development lifecycle.

6. The method of claim 1, wherein the analysis indicates malicious code insertion based on collected behavioral tracking data from at least two of the plurality of sensors.

7. The method of claim 1, further comprising the steps of:
(g) creating the baseline behavior parameter; and
(h) storing the baseline behavior parameter in the database.

8. The method of claim 7, wherein the baseline behavior parameter is created based on industry accepted software development processes.

9. The method of claim 7, wherein the baseline behavior parameter is based on collected behavioral tracking data.

10. The method of claim 7, wherein the baseline behavior parameter is based on collected behavioral tracking data from a plurality of software developers.

11. One or more non-transitory computer storage media having stored thereon multiple instructions that facilitate the identification of malicious code insertions by, when executed by one or more processors of a computing device, causing the one or more processors to:

connect an analysis server to a computing device utilized by a software developer to develop at least a portion of a software program;

collect, via a plurality of sensor modules coupled to the analysis server, behavioral tracking data, that comprises instruction to produce, for a given commit, an instrumented binary code to record its own execution, from the computing device, the behavioral tracking data indicating a software developer behavior during software development and including metadata indicating a development action, the development action caused by the software developer behavior and the behavioral tracking data includes testing behavior;

execute by a testing driver the instrument binary code, which results in a trace or execution lines and paths through an original source file;

store, in a database communicatively coupled to the analysis server, the behavioral tracking data;

analyze, via the analysis server, the software program for the presence of malicious code, the analysis including a comparison of the stored behavioral tracking data to a baseline behavior parameter stored in the database;

flag, via the analysis server, the development action where the analysis indicates malicious code insertion; and present, via a user interface communicatively coupled to the analysis server, an analysis report, the analysis report comprising an analyzing step result and a flagging step result.

12. One or more non-transitory computer storage media as recited in claim 11, wherein the multiple instructions further cause one or more processors to:

perform a static code analysis of the software program;
wherein the analysis indicates malicious code insertion when a behavioral anomaly and a static code analysis anomaly are detected.

13. One or more non-transitory computer storage media as recited in claim 11, wherein the plurality of sensors further to collect behavioral tracking data related to at least one of coding behavior, testing habits, build behavior, and work habits.

14. One or more non-transitory computer storage media as recited in claim 11, wherein collection of behavioral tracking data from the computing device occurs over time.

15. One or more non-transitory computer storage media as recited in claim 11, wherein collection of behavioral tracking data from the computing device occurs throughout a software development lifecycle.

16. One or more non-transitory computer storage media as recited in claim 11, wherein the analysis indicates malicious code insertion based on collected behavioral tracking data from at least two of the plurality of sensors.

17. One or more non-transitory computer storage media as recited in claim 11, wherein the multiple instructions further cause one or more processors to:

create the baseline behavior parameter; and
store the baseline behavior parameter in the database.

18. One or more non-transitory computer storage media as recited in claim 17, wherein the baseline behavior parameter is based on collected behavioral tracking data from a plurality of software developers.

* * * * *